Feb. 8, 1966     J. F. ZIEVERS ET AL     3,233,739
PERFORATED TUBE
Filed Aug. 16, 1962
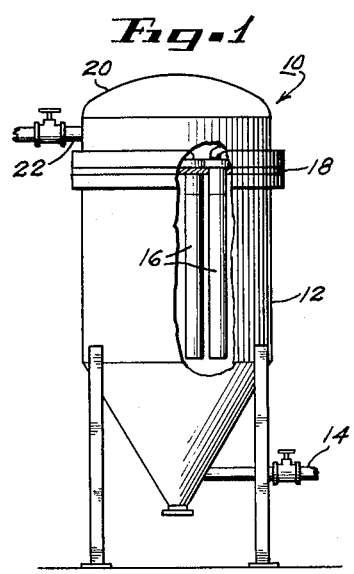
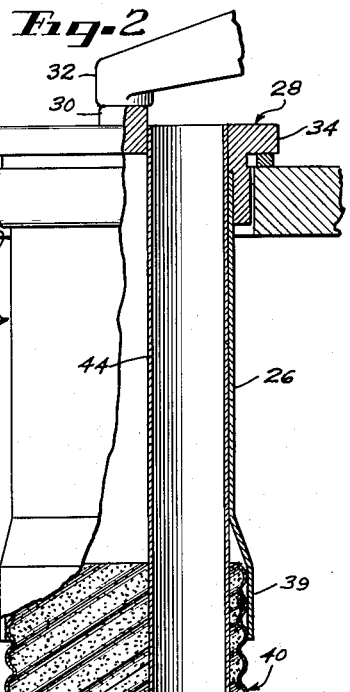
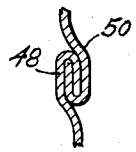
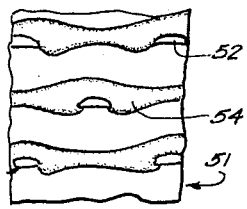
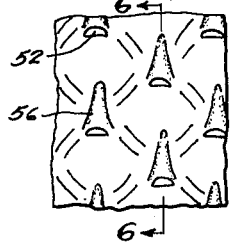
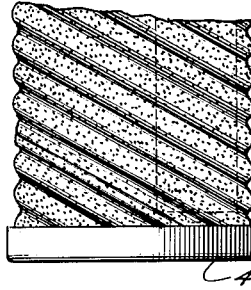
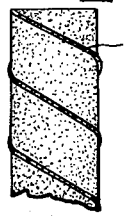
INVENTORS
James F. Zievers
BY Henry Schmidt, Jr.
Fidler, Beardsley & Bradley
ATTORNEYS

United States Patent Office 3,233,739
Patented Feb. 8, 1966

3,233,739
PERFORATED TUBE
James F. Zievers, La Grange, and Henry Schmidt, Jr., Hinsdale, Ill., assignors to Industrial Filter & Pump Mfg. Co., Cicero, Ill., a corporation of Illinois
Filed Aug. 16, 1962, Ser. No. 217,366
5 Claims. (Cl. 210—497)

The present invention relates in general to perforated metal tubes, and it more particularly relates to a new and improved tubular filter element, and method of making it, the construction of which element eliminates the need for an interior core or support member for the finely perforated exterior surface which supports the filter aid.

Tubular filter elements of the type used, for example, to remove solid impurities from water and for recovering dry cleaning solvents, usually employ a rigid core element over which a finely perforated sleeve, formed of a metal screen or of a cloth fabric, is attached. A thin porous layer of a filter aid material of diatomaceous earth, asbestos or the like is deposited on the outer surface of the perforated sleeve thereby to provide a filter cake across the pores of which the entrained solids are entrapped as the liquid to be clarified is forced therethrough into the tube.

In order to provide an effective surface on which to deposit the filter aid material, the perforations in the sleeve should be extremely small in cross-sectional area, not exceeding about one micron in the maximum cross-sectional dimension. This necessitates the use of a very thin sleeve which thus dictates the need for a sturdy core for backing up the sleeve to prevent its collapsing under the extremely high pressure differentials encountered during normal use. These pressures are usually in the vinicity of 45 p.s.i., but may be as high as 90 p.s.i. in some cases.

Inasmuch as the materials used in filter tubes must be resistant to corrosion by the liquids being treated, such metals as stainless steel, brass, and titanium are commonly used for the perforated sleeve and for the core. These metals are costly, and consequently the cost of the filter elements constitutes a substantial part of the overall cost of a complete filter. If possible, therefore, it would be desirable to provide a tubular filter element in which the perforated outer sleeve on which the filter aid is deposited has sufficient strength to obviate the need for a back-up core. A substantial savings in manufacturing cost could thus be achieved.

Therefore, the principal object of the present invention is to provide a new and improved filter element.

Another object of the present invention is to provide a tubular filter element employing a foraminated sleeve on which a filter aid material may be directly deposited and which is sufficiently rigid to maintain its shape under pressure differentials encountered in normal use.

A further object of the present invention is to provide a new and improved method of making a tubular filter element.

Briefly, the above and further objects are realized in accordance with the present invention by providing a tubular filter element formed of a helically wound band of a perforated sheet material in which the material is strengthened in the vicinity of each perforation and in which helical corrugations are provided further to strengthen the tube. Moreover, the adjacent edges of the helical band are secured together in such a way as to provide a helical seam of added strength thereby further to strengthen and to rigidify the tube. One end of the tube is closed by an imperforate end cap and an apertured end cap is provided over the other end of the tube to interconnect the cavity in the tube to the outlet of the filter.

Further objects and advantages and a better understanding of the present invention may be had by reference to the following detailed description taken in connection with the accompanying drawing in which:

FIG. 1 is a side elevational view, partly broken away, showing the manner in which the filter tubes embodying the present invention may be mounted in an associated filter;

FIG. 2 is a longitudinal, sectional view of a tubular filter element embodying the present invention;

FIG. 3 is a greatly enlarged sectional view of a small portion of the wall of the filter tube of FIG. 2 showing the manner in which the filter cake is deposited thereon during use of the filter;

FIG. 4 is a greatly enlarged cross-sectional view taken along the line 4—4 of FIG. 2 and particularly showing the construction of the tube wall;

FIG. 5A is a greatly enlarged plan view of one surface of the perforated material from which the tube of FIG. 2 is formed and FIG. 5B is a plan view of the opposite face of the same material;

FIG. 6 is a cross-sectional view taken along the line 6—6 of FIG. 5B; and

FIGS. 7, 8 and 9 are somewhat schematic views illustrating the steps employed in forming the perforated tubular portion of the filter tube of FIG. 2.

As briefly discussed hereinabove, the present invention is particularly concerned with perforated wall tubular filter elements on the outer surface of which a filter cake is adapted to be deposited as a liquid to be clarified is forced under pressure into the central cavity of the tube. Filter tubes of this type must be sufficiently strong and self-supporting to withstand extremely high pressure differentials across the walls thereof, and in many applications to withstand extremely high operating temperatures while being subjected to the deterioration effects of highly corrosive liquids. These requirements dictate that the filter tubes be well constructed and that they be made of materials which, at the present time at least, are extremely expensive. Therefore, it is desirable that such tubes have a substantially long life and since filters require periodic maintainence wherein the tubes are removed from the filter tank, the filter tubes should be extremely sturdy so that when subjected to rough handling they will not be damaged. All of these requirements have in the past only been met by filter tube designs in which a relatively heavy, rigid core is provided for supporting a thin walled perforated screen or fabric which is mounted thereon. Two parts, both of which are continually bathed in the liquid to be clarified during use are thus required and both must generally be made of a corrosion resistant material. In accordance with the teachings of the present invention the thin walled screen is so constructed that the inner core may be eliminated while, at the same time, providing a filter tube which meets the heretofore discussed requirements.

Referring now to the drawing and particularly to FIG. 1 thereof, there is shown a multiple tube filter 10 including as its principle elements a generally cylindrical, vertically disposed tank 12 to the conical lower end of which is connected an inlet conduit 14 for supplying, under pressure, the liquids to be clarified. A plurality of filter tubes 16 are supported on a tube sheet 18 and depend into the filter chamber within the tank 12. A dome-shaped cover 20 is sealably secured in place over the tube sheet 18 and an outlet conduit 22 is connected thereto for conveying the clarified liquid away from the filter. As will be described in greater detail hereinafter, the tubes 16 are substantially cylindrical in shape and have a perforated wall surface across the interstices of which solids entrained in the liquid passing through the filter are trapped. In practice, a filter aid material such as a diatomaceous earth or a finely particulated asbestos is entrained in a liquid which is passed through the filter thereby to deposit a layer of the filter aid material on the surfaces of the tubes 16 as shown in FIG. 3. This layer of filter aid material is inherently porous and provides the filter media across the pores of which solids entrained in the actual liquid to be clarified are collected.

Referring now to FIG. 2, there is shown in greater detail a filter tube 16 embodying the present invention. As there shown, the tube 16 comprises an imperforate tubular upper portion 26 having its upper end suitably secured to a generally imperforate circular cap 28 having an upstanding centrally disposed boss 30 over which is disposed a movable arm 32 which holds the cap 28 in place on the tube sheet 18. The cap 28 includes an annular flange 34 overlying the edge of a circular aperture 36 in the tube sheet 18 and a resilient annular gasket 38 is disposed between the flange 34 and the adjacent upper surface of the tube sheet 18 to provide a fluid tight seal between the cap and the tube sheet. A filter tube construction of this particular configuration is described in greater detail in a co-pending application of James F. Zievers and Earl A. Borre, filed January 22, 1962, Serial No. 167,743, now abandoned, which application is assigned to the same assignee as is the present invention.

The lower end of the imperforate tube 26 is flared outward at 39 and receives the upper end of a tubular member 40 which is finely perforated throughout its length. Because the perforations in the member 40 must not exceed a maximum dimension of the order of 100 microns, the sheet material from which the member 40 is made must be extremely thin, having, for example, a wall thickness of approximately 0.19 inch. A sheet of material having such a small thickness is not normally able to withstand the high differential pressures existing in tubular filters and the particular construction of the material from which the tube 40 is formed and the particular construction of the tube 40 itself is one of the principal features of the present invention as described in greater detail hereinafter.

The lower end of the tube 40 is closed off by any suitable means, but preferably it is directly molded into a bottom imperforate cap 42 which, like the cap 28, may be formed of an epoxy resin. In other words, the lower end of the tube 40 is potted in the member 42. In the particular filter element 16 illustrated in FIG. 2, an imperforate conduit 44 extends through the cap 28 and depends within the tubes 26 and 40 to a location in proximity to but spaced from the bottom cap 42 to provide a sufficient area through which the clarified liquid within the tube may pass up through the conduit 44 and into the dome chamber from which it flows out through the outlet conduit 22. The filter tube 16 is of a particular type in which the tubular member 40 finds a particularly suitable application, but it will be understood by those skilled in the art that a similar tube in which the conduit 44 is eliminated so that the clarified liquid may flow directly up from the tube 16 and out through a suitable aperture in the cap 28 can be employed. In a similar manner the imperforate tube 26 may be eliminated and the upper end of the perforated tubular member 40 may be potted directly into the cap 28 in the same way in which it is potted at the bottom in the cap 42.

In order to provide the tubular member 40 with sufficient strength to withstand the high pressures of rough handling which will be encountered during normal use, the member 40 is formed with helical corrugations which, in a tube 2½ inches in diameter, have a pitch of 3 inches. These corrugations may be spaced ¼ inch apart. These corrugations in themselves, however, do not provide the necessary strength which is required. In addition thereto, a helical seam 46 which extends parallel to the corrugations is provided. Moreover, the perforated material itself is so constructed as to provide substantially greater strength than that which is obtained in more conventional types of metal screening. The seam 46 may be formed in a number of ways, but preferably the entire tube 40 is formed of a spirally wound sheet of perforated metal whose adjacent edges are secured together as best shown in FIG. 4 by means of an interlock, wherein the upper end portion 48 of the lower band is reversely bent to interlock with the reversely bent lower portion of the next upper band 50. Preferably, the seam is compressed under pressure, as by rolling, so as to make an extremely tight and unitary connection between the adjacent portion of the tube, thereby to provide a unitary tubular member 40. The interlocking seam 46 has the particular advantage in this type of tube of providing a continuous helically extending portion of substantially increased strength inasmuch as the tube has a seam thickness four times greater than the sheet stock thickness. However, if conditions permit, the seam may be formed by welding, but in that case a sufficient amount of welding metal should be used to provide the added strength which is required to prevent collapsing of the tube during use.

Refer now to FIGS. 5A, 5B and 6, wherein are illustrated greatly enlarged views of the material of the perforated sheet stock of which the tube 40 is made. Perforated sheets of this type are readily obtainable on the market and are sold by National-Standard Company of Carbondale, Pennsylvania. This material, in a satisfactory tube constructed in accordance with the present invention, comprises a plurality of apertures 52 of somewhat elongated shape, having a maximum cross-sectional dimension of less than one micron and spaced apart by approximately ⅛₆ inch. The material may be stainless steel having a thickness of about .019 inch. Each of the perforations 52 are at least partially surrounded by a raised dimple-like portion 54 which, during manufacture of the sheet, is generally trapezoidal in nature. A complementary recess 56 is thus provided on the opposite side of the sheet, as shown in FIG. 5B. The sheet may, after deformation into the shapes 56 and 57 and perforation of the holes 52, be rolled under pressure to smooth out the surfaces of the sheet without completely eliminating the deformed portions which surround each of the apertures 52. FIG. 6 shows a cross-sectional view of such a sheet which has been rolled very smooth.

It will be apparent that the sheet from which the tube 40 is formed may be used with either surface exposed, even though the two surfaces do differ from one another. However, in order to facilitate back washing of the filter wherein a clean liquid flows in a reverse direction through the filter to dislodge the filter cake from the outer surface thereof, it is perferable to form the tube with the raised surface of FIG. 5A on the outside of the tube.

In order to form the tube 40 into the configuration shown, a strip of the perforated material 51 should be formed and then wound into a helical tube as shown in FIG. 8. The seam 46 may be formed simultaneously with the formation of the tube or it may be made in a following operation. Thereafter, the helical corrugations may be rolled in the tube to provide the construction illustrated in FIG. 9. However, the corrugations may be formed simultaneously with the making of the tube and the making of the seam 46.

While the present invention has been described in connection with particular embodiments thereof, it will be understood that those skilled in the art may make many changes and modifications without departing from the true spirit and scope of this invention and, therefore, it is intended in the appended claims to cover all such changes and modifications which fall within the true spirit and scope of this invention.

We claim:
1. A tubular filter element comprising,
   a tube formed of helically wound tape of sheet material, the adjacent edges of said tape being interlocked and rolled together to provide a helical seam of increased thickness and strength,
   said sheet material being extremely thin and deformed to provide a plurality of closely spaced, raised portions on one facial side and a plurality of complementary disposed recesses on the other facial side,
   said raised portions being perforated with the area of each perforation being substantially less than the area of the surrounding raised portion,
   said perforations having a maximum dimension of no more than 25 microns,
   said tube being provided with a plurality of helical corrugations extending parallel to one another and to the seam,
   an imperforate cap formed of a strong, rigid material secured to and closing off one end of said tube, and
   a second cap secured to the other end of said tube, said second cap having a hole therein for passing fluid into and out of said tube.

2. The invention set forth in claim 1 wherein said imperforate cap is formed of a plastic material which is molded directly onto said one end of said tube to provide a fixed bond between said tube and said cap.

3. The invention set forth in claim 1 wherein said perforations have a maximum dimension of 1 micron.

4. The invention set forth in claim 1 further comprising an imperforate tube secured to said second cap and extending through said hole in said second cap into proximity to but spaced from said first cap, said imperforate tube being sealed about its periphery to said second cap to prevent the flow of fluid between said imperforate tube and said second cap.

5. The invention as set forth in claim 1 wherein said one facial side of said sheet material faces outwardly of said tube.

References Cited by the Examiner
UNITED STATES PATENTS

| | | | |
|---|---|---|---|
| 1,800,642 | 4/1931 | Johnson | 29—163.5 |
| 2,136,942 | 11/1938 | Freeze | 113—35 |
| 2,143,072 | 1/1939 | Johnson | 1—39 |
| 2,282,176 | 5/1942 | Fay et al. | 113—35 |
| 2,781,097 | 2/1957 | Nold | 29—163.5 X |
| 2,784,846 | 3/1957 | Olson et al. | 210—333 |
| 2,826,308 | 3/1958 | Koupal | 210—333 X |
| 2,834,473 | 5/1958 | Battey | 210—333 |

REUBEN FRIEDMAN, *Primary Examiner.*

HERBERT L. MARTIN, *Examiner.*